(12) United States Patent
Scherbarth

(10) Patent No.: US 7,175,370 B2
(45) Date of Patent: Feb. 13, 2007

(54) INDEXABLE CUTTING BIT FOR TURNING

(75) Inventor: Stefan Scherbarth, Neuss (DE)

(73) Assignee: Sandvik Intellectual Property AB, Sandviken (SE)

( * ) Notice: Subject to any disclaimer, the term of this patent is extended or adjusted under 35 U.S.C. 154(b) by 0 days.

(21) Appl. No.: 11/136,590

(22) Filed: May 25, 2005

(65) Prior Publication Data

US 2006/0029475 A1 Feb. 9, 2006

(30) Foreign Application Priority Data

Jun. 1, 2004 (DE) ............... 10 2004 026 601

(51) Int. Cl.
*B23B 27/16* (2006.01)
(52) U.S. Cl. .................... 407/113; 407/103
(58) Field of Classification Search ............... 407/113, 407/103, 107; *B23B 27/16*
See application file for complete search history.

(56) References Cited

U.S. PATENT DOCUMENTS

| | | | | | |
|---|---|---|---|---|---|
| 4,572,713 | A | * | 2/1986 | Schmidt | 407/114 |
| 4,936,719 | A | * | 6/1990 | Peters | 407/42 |
| 5,059,069 | A | * | 10/1991 | Lagerberg | 407/113 |
| 5,964,552 | A | * | 10/1999 | Larsen | 407/113 |
| 6,126,366 | A | * | 10/2000 | Lundblad | 407/102 |
| 6,138,540 | A | * | 10/2000 | Niemi | 82/1.11 |
| 6,213,691 | B1 | * | 4/2001 | Leeb | 407/34 |
| 6,341,923 | B1 | * | 1/2002 | Niemi | 407/24 |
| 2002/0061235 | A1 | * | 5/2002 | Maier | 407/113 |
| 2004/0253063 | A1 | * | 12/2004 | Murrell | 407/113 |

FOREIGN PATENT DOCUMENTS

JP 2001310204 A * 11/2001

* cited by examiner

*Primary Examiner*—Monica Carter
*Assistant Examiner*—Sara Addisu
(74) *Attorney, Agent, or Firm*—Drinker Biddle & Reath LLP

(57) ABSTRACT

An indexible cutting bit includes an upper side of polygonal contour defining at respective corners thereof a secondary cutting edge which extends between first and second main cutting edges. The secondary cutting edge includes, in order of closeness to the first main cutting edge: a convexly curved transition first portion extending from an end of the first main cutting edge, a concavely curved second portion of a second radius, a convexly curved third portion of a third radius, a concavely curved fourth portion of a fourth radius, a convexly curved fifth portion of a fifth radius, a concavely curved sixth portion of a sixth radius, and a convexly curved transition seventh portion extending to the second main cutting edge.

19 Claims, 6 Drawing Sheets

INDEXABLE CUTTING BIT FOR TURNING

The present application claims priority under 35 U.S.C. §119 to Patent Application Serial No. 10 2004 026 601.8 filed in Germany on Jun. 1, 2004.

BACKGROUND

The present invention concerns an indexable cutting bit for the turning of a polygonal basic shape which is defined by an upper side of polygonal contour, a parallel lower side and peripherally extending side faces interconnecting the upper and lower sides. The intersection of the side faces at least with the upper side defines cutting edges which comprise main cutting edges and secondary cutting edges. The substantially polygonal contour shape is defined by a generally triangular basic shape which has cut-off corner regions, wherein the main cutting edges are defined by the sides of the basic shape and the secondary cutting edges are defined by the cut-off corners. Each secondary cutting edge includes at least one concave and at least one convex cutting edge portion.

Such cutting bits are known for example for turning tubular, annular or pot-shaped work materials. In that case it is often necessary to use two different indexable cutting plates for external and internal machining of such a cylindrical workpiece. Corresponding cutting bits which are known from the state of the art are shown in accompanying FIGS. 1 and 2. Those cutting bits in accordance with the state of the art are of a square basic shape, wherein main cutting edges are defined along the transition of a top side face to the peripheral side faces, while the cut-off corner regions define secondary cutting edges.

A first cutting bit which is shown in FIG. 1 has at the transition from a main cutting edge h1 to a secondary cutting edge n1 in the corner region firstly a convex transition b1 followed by a concave cutting edge portion d1 at which there is again a convex transition c1 to the other main cutting edge adjacent to the corner. The secondary cutting edge therefore substantially comprises two convex transitions to the main cutting edges and a concave cutting edge portion disposed therebetween.

The cutting bit shown in FIG. 2 is of substantially the same basic structure, that is to say a main cutting edge h2 along a side of the (square) polygonal basic shape and a secondary cutting edge n2 in a cut-off corner region, wherein that secondary cutting edge is again formed from the convex transition b2 of a main cutting edge to a concave portion d2 of the secondary cutting edge, whereupon there is again a convex transition c2 to the other adjacent main cutting edge. In this example however the radius R of the convex transition C2 to the other adjacent cutting edge is substantially larger than the radius of the transition b2 from the first main cutting edge to the concave region. The purpose of that configuration can best be understood by referring to FIG. 3.

FIG. 3 shows the two cutting bits already illustrated in FIGS. 1 and 2 in use on the wall of a hollow-cylindrical workpiece. The wall of the hollow-cylindrical workpiece is shown here hatched in section, wherein the relative dimensions and in particular the proportion of the wall which is to be cut away are not shown true to scale. When dealing with certain cylindrical workpieces it may for example be desirable for the outside wall of the hollow-cylindrical workpieces to involve a greater roughness depth than the inner wall, or vice-versa.

By way of example let the upper side S in FIG. 3 be the outside cylindrical surface of the hollow-cylindrical workpiece and the lower side S' in FIG. 3 be the inside cylindrical surface. The upper cutting bit 1 brings the outside surface to its definitive dimension using its main cutting edge h1 and its secondary cutting edge n1, the main cutting volume being afforded by the main cutting edge while the secondary cutting edge performs a finishing operation. During the finishing operation of the upper bit 1, a relatively thin cutting is also removed by the convex transition c1 from the concave cutting edge portion d1 to the non-active main cutting portion h1' which is of a relatively small radius of curvature. In the case of the lower cutting bit 2, the main cutting work is also performed by the main cutting edge h2 and the secondary cutting edge n2 performs a finishing operation in a similar manner to the upper cutting edge, in this case however by the transition c2 from the concave portion d2 of the secondary cutting edge to the adjacent, non-active main cutting edge h2' along a relatively large radius of curvature R. In this way the inside surface becomes substantially smoother and involves a substantially smaller roughness depth than the outside surface, as is also desired on the basis of corresponding predetermining factors.

It will thus be appreciated that the machining of corresponding workpieces in which the inside surface and the outside surface are to involve different respective roughness depths necessarily requires the use of two different types of cutting bits, although the cutting bits are otherwise produced from the substantially identical square basic shape and only the corner regions have to be correspondingly modified. In that respect confusion by an operator in respect of the cutting bits intended for the inside and outside surfaces can relatively easily occur, especially as in practice those cutting bits are only about 1/10th of the size as illustrated in the accompanying figures. The differing radii of curvature in the corner regions are therefore to be perceived with the naked eye only when particular attention is paid in that respect.

This correspondingly requires the stock-keeping of two different cutting bits which have to be carefully distinguished, and the cutting bits also have to be carefully distinguished upon fitment or installation in corresponding tools or tool holders. Added to that is the fact that only a small part of each of the main cutting edges is used as an active cutting edge while the major part of the main cutting edge remains unused and the cutting bit is worn after being indexed by turning three times (a total of four bit positions), assuming that single-sided cutting bits are involved here.

In comparison with that state of the art an object of the present invention is to provide a cutting bit for turning, which permits simultaneous roughing and finishing machining with selectively different roughness depths.

SUMMARY OF INVENTION

That object is attained in that the secondary cutting edge, starting from a small transition radius r1 at the transition of a first adjacent main cutting edge, is of the following configuration:

a) concave with a radius $R_1$,
b) convex with a radius R,
c) concave with a mean radius $R_3$,
d) convex with a radius r, and
e) concave with a radius $R_2$, and with a subsequent convex transition to the second main cutting edge with a small transition radius $r_2$.

In the preferred embodiment moreover the following further boundary condition applies:

$$R > r, r1, r_2.$$

It is to be noted in that respect that the radii which are essential for the invention and which determine the roughness depth are the radii R and r. The radii $r_1$ and $r_2$ only define the slightly rounded-off transition from the main cutting edge to the secondary cutting edge, which can actually also still be attributed to the main cutting edge, because the workpiece surface prior to the finishing operation is produced with that transitional or corner region from the main cutting edge to the secondary cutting edge. The radii $r_1$ and $r_2$ could therefore be even larger than the radii r and/or R, for many areas of use. In many cases the radii r and R could also be equal or approximately equal. At any event that also affords the advantage of an increase in the number of cutting edges which can be effectively used, while confusion in respect of the cutting bits or simplification in terms of stock-keeping would no longer be the crucial argument in such a case.

The radius $R_3$ is also of subordinate significance and in particular does not have to be a fixed radius, but is a transition of any concave nature between the two convex radii R and r, which is only to afford a certain distance between the cutting edge portions with the different convex radii.

That design configuration makes it possible to use one and the same cutting bit for the roughing and finishing operations with (generally) different roughness depths which are defined by the nature of the secondary cutting edges, as can be most easily appreciated by reference to FIG. 4. In FIG. 4 the lower cutting bit is turned in such a way that the portion of the secondary cutting edge of the radius R is used for the finishing operation while the convex portion of the radius r remains out of engagement by virtue of a corresponding slight tilting of the cutting bit. In the case of the cutting bit illustrated thereabove, which is arranged turned through about 170° with respect to the lower cutting bit, the conditions are precisely reversed so that there the secondary cutting edge portion of the radius r is operative for the finishing operation while the portion involving the larger radius R remains out of engagement.

In that way each of the cutting corners can be used in two different orientations and the adjoining main cutting edge portions are used for coarse machining on both sides of a cutting corner. The cutting bit is thus substantially more effectively used and, even in the case of a cutting bit of only triangular basic shape, it can be used in a total of six different orientations, that is to say it can be used six times, whereas the cutting bits known from the state of the art, of a square shape, can only be used four times in different orientations. In addition this affords the further advantage that the cutting bits do not need to be distinguished as they are identical to each other and the desired main and secondary cutting edges are automatically received in the correct orientation by virtue of installation in appropriate tools or tool holders. The cutting bit which is of triangular basic shape also has the advantage that two-side faces which are inclined relative to each other through 60° can be used as contact faces in a cutting bit holder, which as is known permits a high level of positioning accuracy. In addition however it is also possible for the corresponding cutting bit also to be produced in a square basic shape so that in that case the cutting bit according to the invention can even be used eight times, that is to say in eight different orientations.

In this respect it is clear that specifying the basic shape as a polyhedron with cut-off corners only serves to illustrate the geometrical shape which is formed alternately from main and secondary cutting edges which are angled relative to each other. Instead of referring to a triangular basic shape with cut-off corners therefore it would equally well be possible to refer to the basic shape as that of a hexagon in which main and secondary cutting edges alternate along the successive sides of the hexagon. A similar consideration applies to the square shape which could also be defined as an octagon, in which respect it will be noted that in both of the above-indicated cases the main and secondary cutting edges do not have to be of the same length. In the preferred embodiment the radius R is at least twice the radius r, preferably at least three times, and in particular the radius R is in the range between 4r and 8r.

The transition radii $r_2$ of the secondary cutting edge in relation to the two adjacent main cutting edges can be substantially identical and are generally also somewhat smaller than the radius r of the secondary cutting edges, in particular the radii $r_1$, $r_2$ are in the range between 0.2×r and 0.8×r, even if that is not necessarily the case, and, as already mentioned, for many situations of use the radii $r_1$ and $r_2$ can also be selected larger than the radius r and even larger than the radius R.

The concave radii $R_1$, $R_2$ should generally also be markedly larger than the transition radii $r_1$, $r_2$, as ultimately they define the distance between an active main cutting edge and the secondary cutting edge which carries out the finishing operation, which should not follow each other too closely in order not to mutually influence each other. The precise values of the radii $R_1$, $R_2$ are however less critical and can be varied within wide ranges.

The concave portion between the convex radii R and r does not necessarily need to involve a fixed radius $R_3$ but can be any concave configuration between those two radii which only afford the distance between the different concave portions of the secondary cutting edge. The other concave and convex radii also do not necessarily have to be constant along the entire concave or convex portion defined thereby, in which respect it will be noted that production with substantially constant radii is simpler and therefore also appropriate.

More specifically in the preferred embodiment of the invention the radius r is between 0.1 and 0.6 mm, the radius R is between 0.5 and 3 mm, the radii $R_1$, $R_2$ are between 0.4 and 2 mm, and the radius $R_3$ (on average) is between 0.2 and 0.8 mm, in which respect it will be appreciated that it is not absolutely necessary for all the above-mentioned radii always to be in the specified ranges and it will also be appreciated that it is possible to envisage embodiments of the invention in which only a part of the above-indicated radii satisfy the stated conditions while the other radii are outside the specified ranges.

If the two transitional corners from the main cutting edges to the secondary cutting edges on both sides of a secondary cutting edge region are connected by a straight line, then in the preferred embodiment of the invention the two convex cutting edge portions involving the radii R and r, as viewed from the centre of the cutting bit, should be on the other side of that connecting line, while the concave regions of the secondary cutting edges involving the radii $R_1$ and $R_2$ should be within or on the near side of such a connecting line.

In the preferred embodiment of the present invention the basic shape of the cutting bit is that of an equilateral triangular with cut-off corners, wherein the cut-off corner regions define the secondary cutting edges and the sides of the triangle which have remained define the main cutting edges. Such a shape can in principle also be considered as a hexagon, wherein it will be noted that the six sides of such a hexagon are alternately of different lengths and also alternately comprise straight and curvedly extending cutting edge portions.

Moreover however it is not critical for the main cutting edges described and illustrated in the preferred embodiment to extend precisely in a straight line but rather, in a plan view on the cutting bit, they could equally well also extend in a concavely or convexly curved configuration or they could be structured in some other fashion, in which respect the only important consideration is that they are of a suitable design configuration for their main function, namely coarse cutting of the work material.

It will be appreciated that the present invention is not limited to the polygonal basic shape of an equilateral triangle, but that in accordance with an embodiment of the invention the basic shape can also be a non-square rectangle or a square rectangle as is known from the state of the art, in which case however the secondary cutting edge configuration would be substantially the same as in the case of a triangular basic shape. This would merely mean than the angle between a main cutting edge and the substantial configuration of the secondary cutting edge would be larger approximately by 15° so that the cutting bit would machine the workpiece with a smaller setting angle.

A particularly preferred embodiment of the present invention is one in which the cutting bit has positive chip geometry, that is to say in which the upper face of the cutting bit is larger than its lower side so that the side faces which connect the upper side and the lower side together include with the upper side an angle of less than 90°.

BRIEF DESCRIPTION OF DRAWINGS

Further advantages, features and possible uses of the present invention will be apparent from the following description of preferred embodiments and the accompanying figures.

DETAILED DESCRIPTION OF PREFERRED EMBODIMENTS

Figure 1:
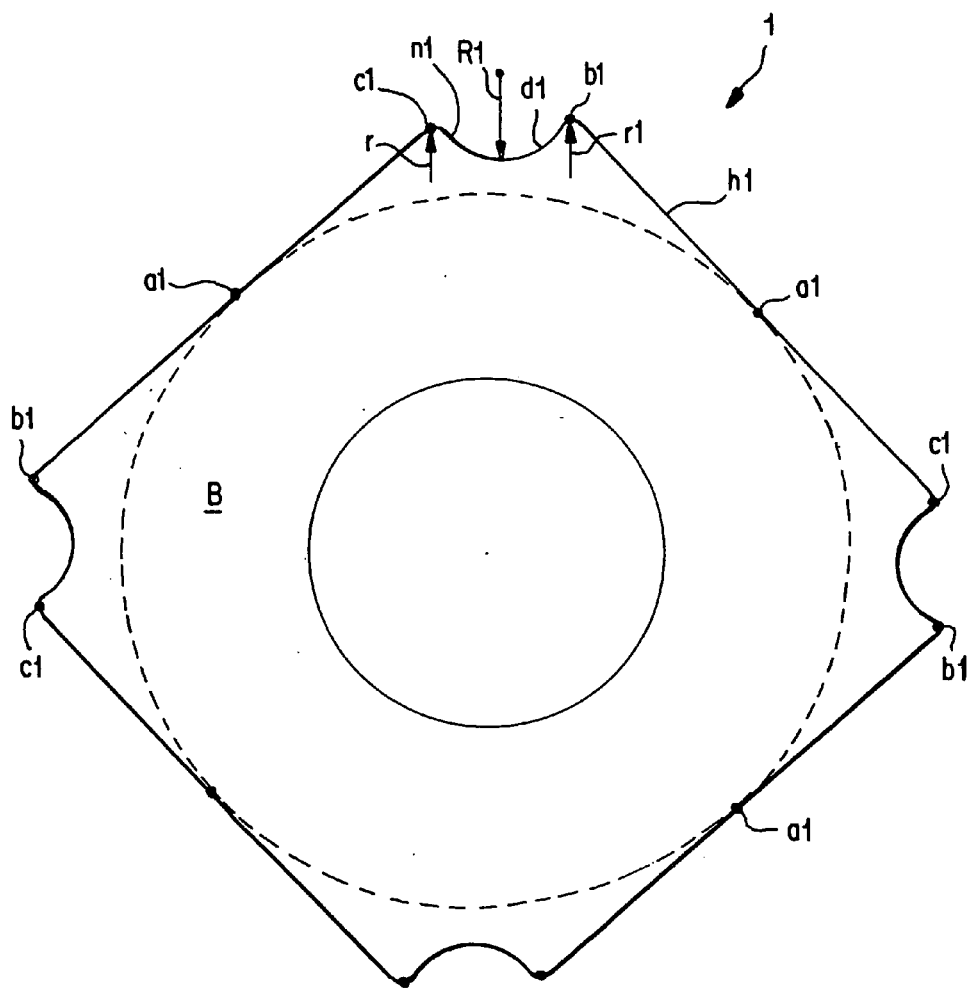
FIGS. 1 and 2 show two different cutting bits as are known from the state of the art.

Referring to FIG. 1 shown therein is a plan view from above of a first cutting bit 1 according to the state of the art. The visible upper side B of the cutting bit forms a rake face. Parts of the cutting bit shown in FIG. 1 form main cutting edges h1 while the cut-off corners form secondary cutting edges n1.

The main cutting edges h1 blend by way of a small corner radius r1 into the secondary cutting edges n1, wherein the secondary cutting edges are defined by a first convex transition b1 of radius r1, a concave portion d1 with the radius of curvature R1 and a subsequent convex portion c1 with the radius of curvature r, which forms the transition to the next side of the square. A main cutting edge h1 extends from point a1 to the intersection thereof with the convex transition b1, and a secondary cutting edge is defined by the portion b1, c1, d1. As is also described hereinafter with reference to FIG. 3, in use of the cutting bit 1 a respective pair of cutting edges h1, n1 is active, there being four such pairs, i.e., the cutting bit has four main cutting edges h1 and four secondary cutting edges n1, and therefore in use it can operate overall in four different positions.

Figure 2:
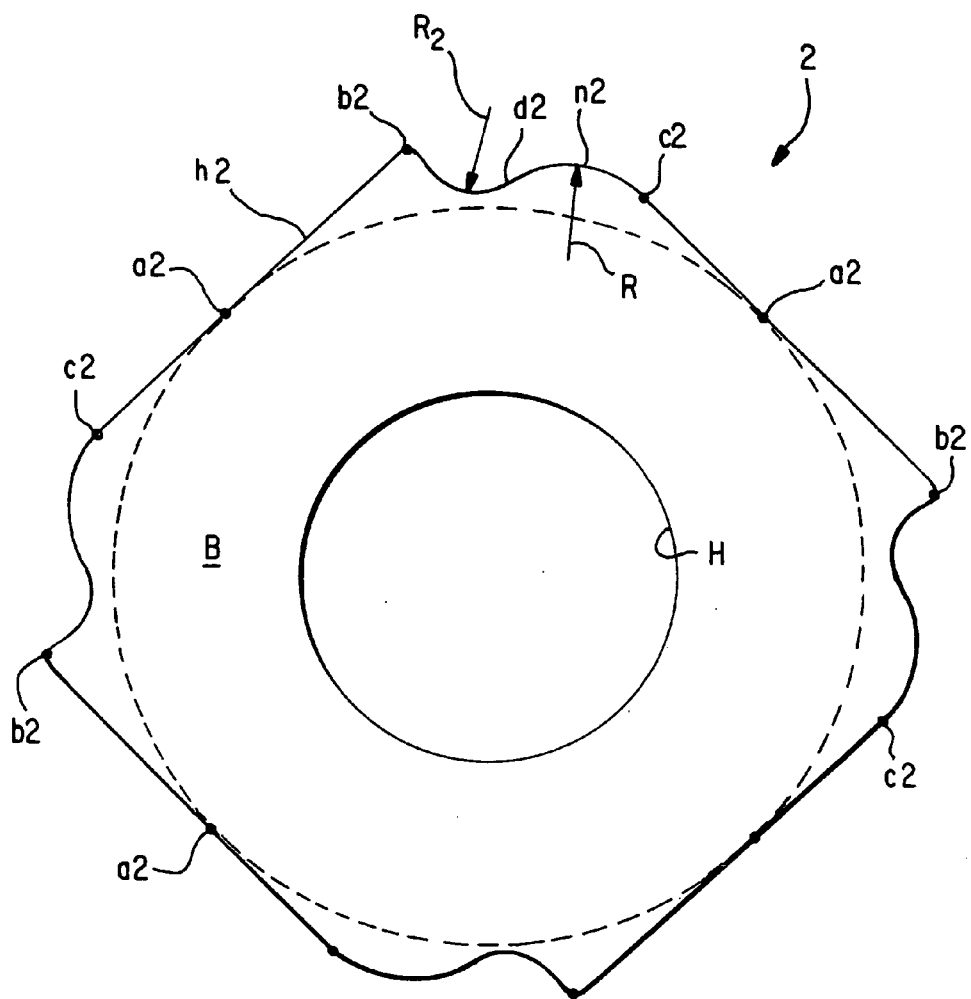

The cutting bit 2 which is shown in FIG. 2 and which also forms part of the state of the art is relatively similar to the cutting bit 1 shown in FIG. 1, the essential difference only being that the transition c2 of the secondary cutting edge n2 of the cutting bit 2 involves a substantially larger radius of curvature R than the corresponding radius r of the secondary cutting edge n1 of the cutting bit 1, and wherein the active secondary cutting edge n2 is spaced from its associated active main cutting edge h2 in a clockwise direction. In contrast, the active secondary cutting edge n1 of the cutting bit 1 is spaced from its associated active main cutting edge h1 in a counterclockwise direction of course, those relationships could be reversed, i.e., clockwise in the insert 2 and counterclockwise in the insert 1.

Figure 3:
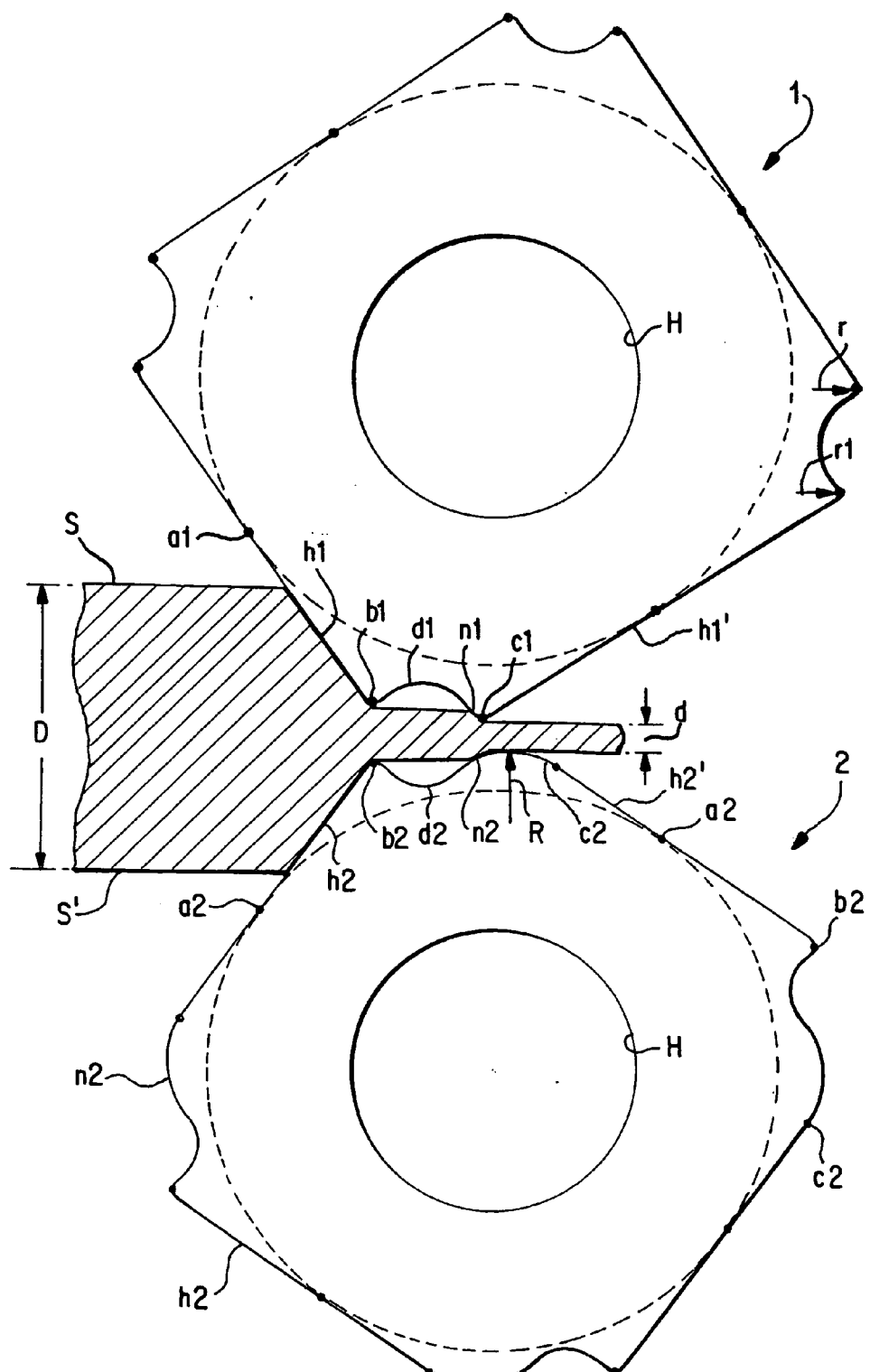
FIG. 3 shows the cutting bits of FIGS. 1 and 2, which are known from the state of the art, in engagement on a workpiece.

The aim and purpose of the specified cutting edge arrangements and shapes will be most clearly apparent from FIG. 3 which shows the two cutting bits 1 and 2 according to the invention in use on a workpiece.

The workpiece W which is shown hatched in section in FIG. 3 can be for example a hollow-cylindrical workpiece, of which here only a portion of the cylindrical wall is shown in section. It will be appreciated that the relative dimensions and in particular the wall thickness are not necessarily illustrated on realistic scales. The only essential point is that machining of the cylindrical wall of the workpiece W takes place both from the inside S' and also from the outside S, the wall thickness D of the blank being reduced to d in the finished workpiece. That is effected with the two specified cutting bits by simultaneous coarse and fine machining, in which respect the two cutting bits do not necessarily have to come into operation at the same time but can also be advanced to the workpiece successively.

In this case the workpiece rotates about its cylinder axis (not shown here) which for example could be in the proximity of the lower edge of FIG. 3. Accordingly the cutting bit 2 shown at the bottom cuts the inside wall S' of the workpiece W while the cutting bit 1 machines the outside wall S. Machining is effected by the two cutting bits in each case by coarse machining with a relatively large material removal volume by the main cutting edges h1 and h2 respectively and at a short distance therebehind the procedure involves fine machining (finishing) by the secondary cutting edges n1 and n2 respectively, in respect of which only relatively little material is still being removed from the wall of the hollow-cylindrical workpiece W.

In the case of many hollow-cylindrical components which are produced by turning, there is a wish for the inside surface and the outside surface of the finished workpiece to have different surface properties, in particular therefore for example the inside surface is to be very smooth while the outside surface is to deliberately involve a greater roughness depth.

That is achieved with the various cutting bits 1 and 2 shown in accordance with the state of the art by virtue of the secondary cutting edge n1, in its active region which comes into engagement with the workpiece W, being of a relatively small radius of curvature r so that, with a given axial feed of the cutting bit relative to the workpiece (towards the left in FIG. 3) a certain, well-defined, constant surface roughness is produced on the outside S of the workpiece W more necessarily by virtue of the relatively small cutting corner radius r.

In comparison the secondary cutting edge n2 is of a substantially larger radius of curvature R, which produces a very smooth surface on the inside S' of the hollow-cylindrical workpiece W with a given axial feed which is identical for example to the axial feed of the cutting bit 1. In this case also the main part of the material removal work is done by the main cutting edge portion h2.

Figure 4:
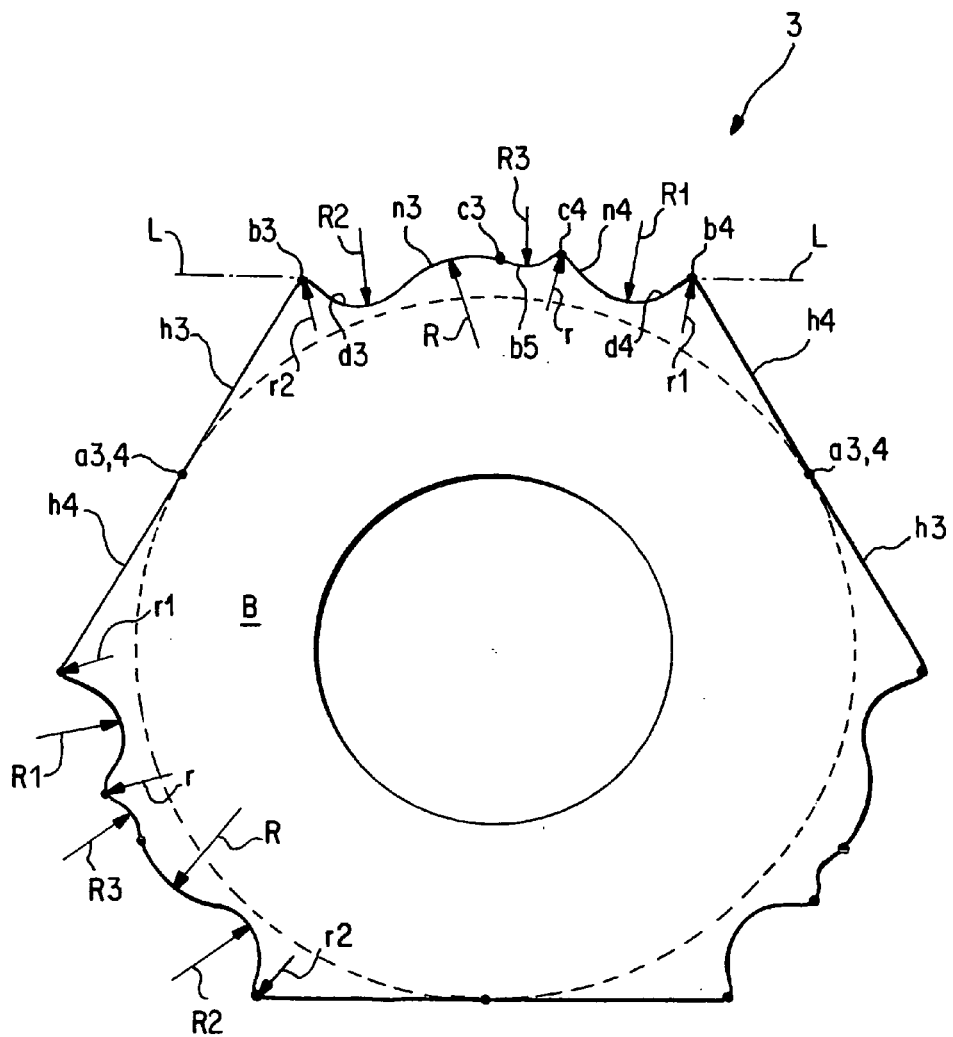
FIG. 4 shows a cutting bit according to a preferred embodiment of the present invention.

FIG. 4 shows a cutting bit 3 according to the invention which combines the properties of both cutting bits 1 and 2 so that there is no longer any need to distinguish between the two various types of cutting bits, but it is possible to use just one single type of cutting bit for the same purpose, that cutting bit also having still more effectively usable cutting edges. Thus, as can be seen in 3, the insert 3 is in the basic shape of an equilateral triangle, the tips or corners of which are cut off.

The sides of the triangle also form main cutting edges h3 and h4 respectively and two secondary cutting edge portions n3, n4 are defined by each of the cut-off corners. Thus, the various main cutting edges h3 and h4 and the different secondary cutting edge portions n3, n4 are arranged on one and the same cutting bit insofar as the secondary cutting edges extending along the cut-off corner regions of the triangular basic shape are defined by a given sequence of convex and concave cutting edge portions.

For a comparison with the cutting bit 1, consideration is to be directed for example to the counterclockwise succession of the portions defined by the main cutting edge h4 and the secondary cutting edge portion n4. The main cutting edge h4 is defined by a straight side of the triangle and extends to a small convex transition b4 of radius r1 to the secondary cutting edge portion n4. There the secondary cutting edge portion is firstly formed by a concave portion d4 with the radius $R_1$ which corresponds to the radius r1 of the prior art cutting bit 1, followed by a convex portion c4 in the region of the point with the radius of curvature r. That corresponds to the transition d1 with substantially the same radius in the prior art cutting bit 1.

If conversely the starting point adopted is the other side of the cutting bit 3, again beginning at the main cutting edge h3 and the secondary cutting edge portion n3, it will be seen that that configuration substantially corresponds to the cutting edge configuration h2, n2 of the prior art cutting bit 2. In this case also the main cutting edge h3 goes to a convex transition b3 of radius r2 into the secondary cutting edge portion n3 which is firstly formed by a concave portion d3 with the radius R2 and a subsequent convex portion c3 with the radius R and terminates approximately at a concave transition b5 between the convex portion c3 and c4. The transition b5 is only intended to afford a certain distance between the ends of the secondary cutting edge portions n3 and n4 respectively.

Figure 5:
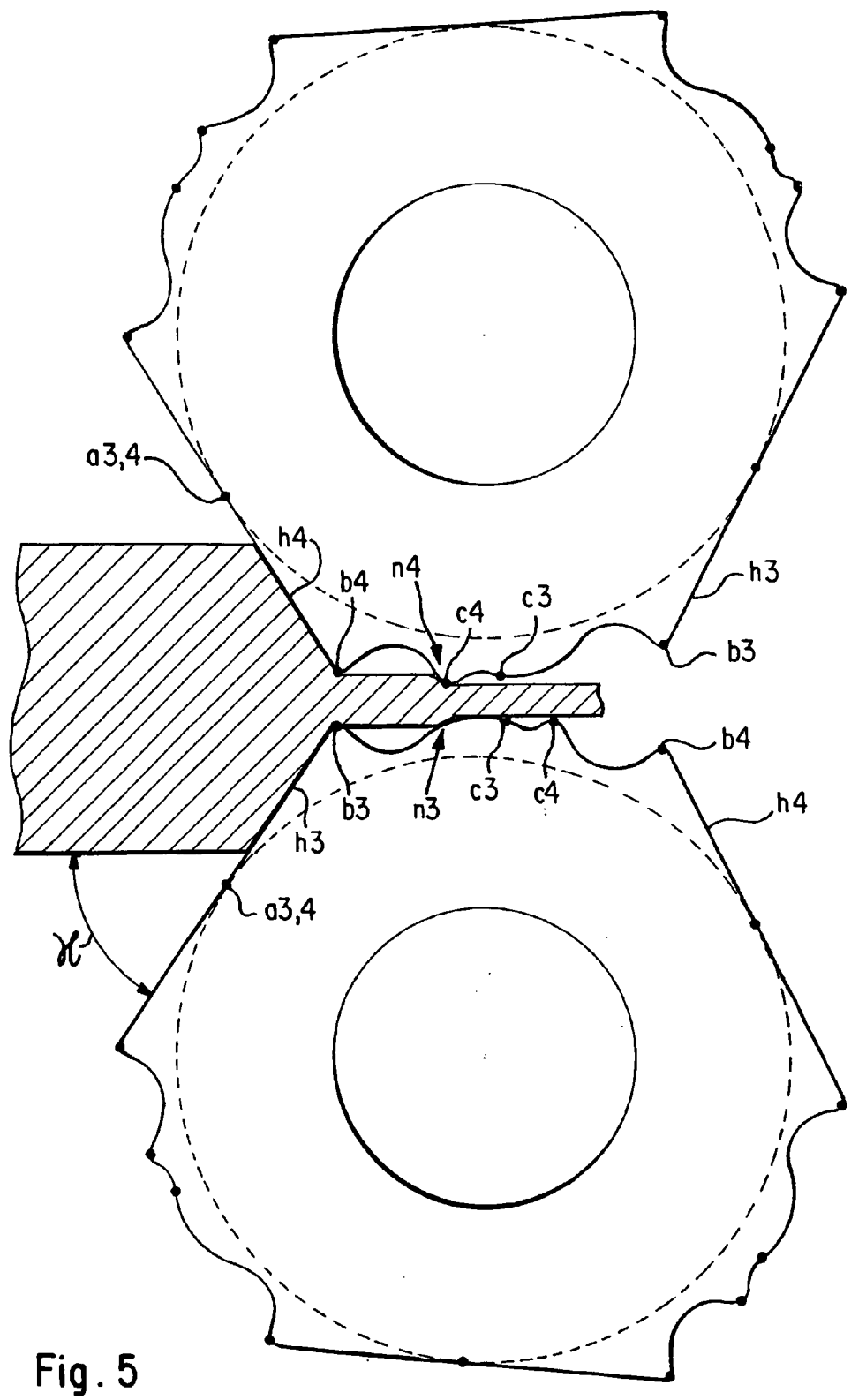
FIG. 5 shows two cutting bits shown in FIG. 4 in use on a workpiece.

Overall, the secondary cutting edge at each corner of the insert 3, starting from the one main cutting edge h3, is defined by a succession of convex and concave portions, namely a convex portion b3 with the radius r2, a concave portion d3 with the radius R2, a convex portion c3 with the radius R, a concave portion b5 with the radius R3, a convex portion c4 with the radius r, a concave portion with d4 the radius R1, and a convex portion b4 with the radius r1, the latter serving as a transition to the next adjacent main cutting edge h4. Thus, the secondary cutting edge comprises two separate secondary cutting edge portions n3 and n4 respectively, of which in use of the cutting bit only a respective one comes into engagement with the workpiece. The mode of operation and the arrangement of the cutting bit in operation is illustrated in FIG. 5.

Thus, it will be appreciated that in the disclosed preferred embodiment, a secondary cutting edge extending from a first main cutting edge h4 to a second main cutting edge h4 comprises, in order of closeness to the first main cutting edge:

- a convex transition first portion b4 of first radius r1 extending from the first main cutting edge h4,
- a concave second portion d4 of second radius R1,
- a convex third portion c4 of third radius r,
- a concave fourth portion b5 of fourth radius R3,
- a convex fifth portion c3 of fifth radius R,
- a concave sixth portion d3 of sixth radius R2, and
- a convex transition seventh portion b3 of radius r2 extending to the second main cutting edge h3.

The fifth radius R is longer than each of the first, third and seventh radii r1, r and r2.

The fifth radius R is a multiple of the third radius r, preferably at least two times, more preferably at least three times, and most preferably between four and eight times the third radius.

The first radius r1 is about equal to the seventh radius r2, and each of the first and seventh radii r1, r2 is between 0.2 times and 0.8 times the third radius r.

Each of the second and sixth radii R1, R2 is larger than (preferably three times) each of the first and seventh radii r1, r2.

The fourth radius R3 is about two times the third radius r.

The third radius r is in the range of 0.1–0.6 mm; the fifth radius R is in the range of 0.5–3.0 mm; each of the second and sixth radii R1, R2 is in the range of 0.4–2.0 mm; and the fourth radius R3 is in the range of 0.2–0.8 mm.

Each of the third and fifth portions c4 and c3 lies outside of an imaginary line L interconnecting the peaks of first and seventh portions b4 and b3, and each of second and sixth portions d4 and d3 is intersected by that imaginary line L.

FIG. 5 is a view similar to FIG. 3, depicting the use of the inserts 3, but his case does not involve using two different cutting bits, but rather two identical cutting bits 3 which however are set in different respective orientations relative to the workpiece W. It can be seen therefrom that, in the case of the upper cutting bit 3, in the illustrated orientation, the main cutting edge h4 and the secondary cutting edge portion n4 are active, in which case the main cutting edge h4, just as in the example of FIG. 3, does the main part of the material removal work and the secondary cutting edge portion n4 ensures fine machining of the turned surface. In the case of the lower cutting bit 3, the main cutting edge h3 and the secondary cutting edge portion n3 are in engagement with the workpiece W, wherein, as in the case of FIG. 3, the workpiece is again a hollow-cylindrical workpiece, the axis of which extends horizontally at the lower edge of the figure or below the lower edge thereof and is not illustrated here.

The upper cutting bit 3 produces a well-defined surface roughness because of the small radius of curvature r of the edge portion C4 of the secondary cutting edge portion n4, while the lower cutting bit 3, by virtue of its secondary cutting edge n3 which is of a small radius of curvature, produces a very smooth surface on the inside of the hollow-cylindrical workpiece. In this case also the relative dimensions and wall thicknesses of the workpiece W are not necessarily reproduced true to scale.

Unlike the cutting bits of FIGS. 1 to 3 in which a main cutting edge was respectively formed only on one side of the point a1 and a2, respectively, along the substantially straight sides of the cutting bit, according to the present invention the portions on both sides of the point a3, a4, which in a similar fashion correspond to the points a1 and a2 respectively, function as main cutting edges h3 and h4 respectively. The cutting bit can be used three times in each of the stated orientations and in addition the upper cutting bit can be respectively interchanged with the lower cutting bit so that each individual cutting bit can be used a total of six times until the respective cutting edges h3, n3 and h4, n4 are all worn.

Therefore this cutting bit has the advantage over the state of the art that there is no need to distinguish between two different cutting bits on the one hand in regard to stock-keeping and also in terms of fitment, but rather a unitary cutting bit can be provided and used, in which case moreover each cutting bit enjoys utilisation which is improved by 50%, and moreover it can operate in a completely identical manner to the prior art cutting bits 1 and 2. Just by virtue of the greater number of cutting edges there is an improvement in economy by 50%, which is additionally further increased by simplified stock-keeping.

Figure 6:
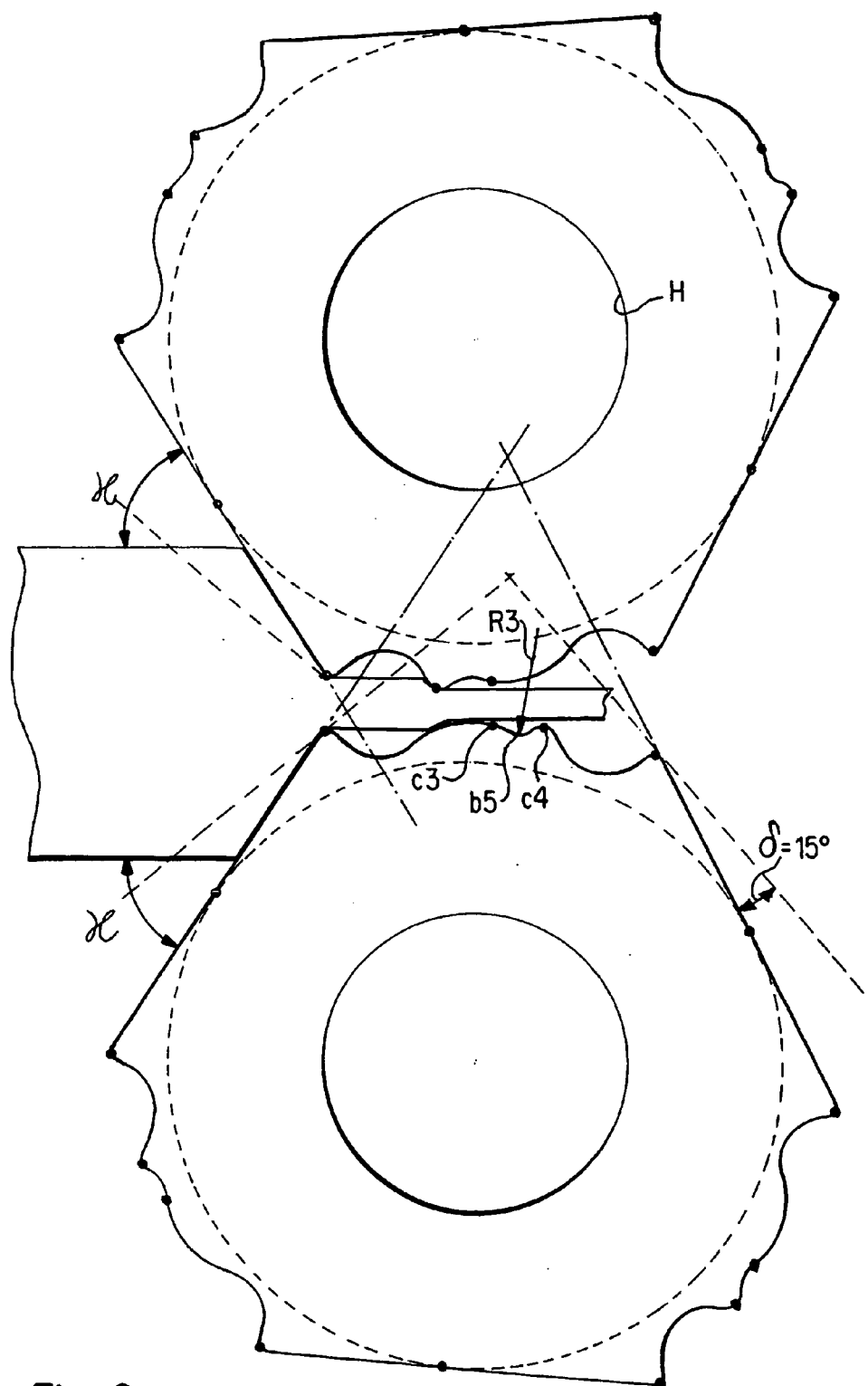
FIG. 6 shows in addition to the cutting bits of FIG. 5 alternative cutting bits which are supplemented as shown in broken line in accordance with the invention of a square basic shape.

It will be appreciated moreover that it is possible for the configuration of the secondary cutting edges according to the invention also to be embodied on a cutting bit which is of a quadrilateral or square basic shape. This is only diagrammatically indicated by broken lines in FIG. 6. That is, FIG. 6, in addition to showing cutting bits of a triangular basic shape, also shows in broken lines the contours of a corresponding cutting bit of a square or non-square rectangular basic shape. It will be seen that it is possible to implement exactly the same configuration of the secondary cutting edges at the cut-off tips of a corresponding square, as in the case of the cutting bits of triangular basic shape. Only the setting angle κ which is about 55° for the cutting bits of triangular basic shape in the illustrated orientation would then be reduced to about 40°. However, insofar as for example the concave portion b5 with the radius R3 between the portions c3 and c4 is also prolonged somewhat, in which case the remaining portions could be somewhat shortened, the setting angle κ could also be still further increased in the case of a square cutting bit, without the risk that, beside a respective one of the secondary cutting edge portions n3, n4, the following, non-active cutting edge portion n4 or n3 respectively also comes into engagement with the surface of the workpiece.

Desirably the cutting bits according to the invention are in the form of positive cutting bits, that is to say the lower face (not shown) of the cutting bit is somewhat smaller than the visible upper side, so that the side faces which connect the lower side and the top side together include an angle of less than 90° with the top side. It will be appreciated that it would additionally also be possible to provide chip forming devices such as chip recesses, chip breakers etc along the cutting edges h3, h4 and n3, n4 respectively on the upper face of the cutting bits 3.

Each of the cutting bits also has a central fixing bore H through which a suitable fixing screw engages for fixing the cutting bit to a cutting bit carrier.

The side faces beneath the respective main cutting edges h3, h4 together with the bottom side (not shown) form contact faces for bearing against a corresponding cutting bit holder having a complementary opening which in the preferred embodiment illustrated ensures a very good level of positioning accuracy.

For the purposes of original disclosure it is pointed out that all features as are disclosed for a man skilled in the art from the present description, the drawings and the claims, even if they were described in specific terms only in conjunction with certain further features, can be combined both individually and also in any combinations with others of the features or groups of features disclosed herein, insofar as that was not expressly excluded or technical factors make such combinations impossible or meaningless. A comprehensive explicit representation of all conceivable combinations of features is waived here only for the sake of brevity and readability of the description.

What is claimed is:

1. An indexible cutting bit for turning, comprising a body having an upper side of polygonal contour, a lower side oriented generally parallel to the upper side, at least three peripheral faces interconnecting the upper and lower sides, wherein intersections between the upper side and the peripheral faces, respectively, define main cutting edges; and minor cutting edges;
    wherein the polygonal contour is defined by an at least triangular shape which has cut-off corner regions, wherein the main cutting edges are defined by the side faces of the polygonal contour and the minor cutting edges are defined by the cut-off corner regions; the minor cutting edge comprising:
    a convexly curved transition first portion extending from an end of a first main cutting edge:
    a concavely curved second portion,
    a convexly curved, intermediate third portion,
    a concavely curved fourth portion,
    a convexly curved, intermediate fifth portion,
    a concavely curved sixth portion, and
    a convexly curved transition seventh portion extending to a second main cutting edge;
    wherein each of the first, third, fifth, and seventh portions is defined by a radius of curvature, wherein the convexly curved, intermediate third portion and the convexly curved, intermediate fifth portion have different radii of curvature, one of said radii being substantially larger than the other and larger than the radius of the convexly curved transition first and seventh portions.

2. The cutting bit according to claim 1 wherein the radius of the fifth portion is greater than the radius of each of the first, third and seventh portions.

3. The cutting bit according to claim 2 wherein the fourth radius is about two times the third radius.

4. The cutting bit according to claim 1 wherein the first through the seventh portions are defined by first through seventh radii, respectively, the fifth radius being longer than each of the first, third and seventh radii.

5. The cutting bit according to claim 4 wherein the fifth radius is at least two times the third radius.

6. The cutting bit according to claim 5 wherein the first radius is about equal to the seventh radius, and each of the first and seventh radii is between 0.2 times and 0.8 times the third radius.

7. The cutting bit according to claim 4 wherein the fifth radius is at least three times the third radius.

8. The cutting bit according to claim 4 wherein the fifth radius is between four and eight times the third radius.

9. The cutting bit according to claim 4 wherein the first radius is about equal to the seventh radius, and each of the first and seventh radii is between 0.2 times and 0.8 times the third radius.

10. The cutting bit according to claim 4 wherein each of the second and sixth radii is larger than each of the first and seventh radii.

11. The cutting bit according to claim 4 wherein the fourth radius is about two times the third radius.

12. The cutting bit according to claim 1 wherein each of the second and sixth radii is larger than each of the first and seventh radii.

13. The cutting bit according to claim 12 wherein each of the second and sixth radii is at least three times each of the first and seventh radii.

14. The cutting bit according to claim 1 wherein the third radius is in the range of 0.1–0.6 mm; the fifth radius is in the range of 0.5–3.0 mm; each of the second and sixth radii is in the range 0.4–2.0 mm; and the fourth radius is in the range of 0.2–0.8 mm.

15. The cutting bit according to claim 1 wherein each of the third and fifth portions lies outside of an imaginary line interconnecting the peaks of the first and seventh portions; and each of the second and sixth portions is intersected by the imaginary line.

16. The cutting bit according to claim 1 wherein the polygonal contour is generally an equilateral triangle.

17. The cutting bit according to claim 1 wherein the polygonal contour is generally rectangular.

18. The cutting bit according to claim 1 wherein the polygonal contour is generally square.

19. The cutting bit according to claim I wherein the bottom side is of smaller area than the upper side; each of the side faces forming an angle less than 90 degrees with the upper side.

* * * * *